US007763993B2

(12) United States Patent
Groff et al.

(10) Patent No.: US 7,763,993 B2
(45) Date of Patent: Jul. 27, 2010

(54) DC UPS WITH AUTO-RANGING BACKUP VOLTAGE CAPABILITY

(75) Inventors: Steven Mark Groff, Tucson, AZ (US); Trung Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 12/174,386

(22) Filed: Jul. 16, 2008

(65) Prior Publication Data

US 2010/0013312 A1     Jan. 21, 2010

(51) Int. Cl.
*H02J 1/00* (2006.01)
(52) U.S. Cl. .......................................... 307/71; 307/66
(58) Field of Classification Search ................... 307/66, 307/71
See application file for complete search history.

(56) References Cited

U.S. PATENT DOCUMENTS

| | | | |
|---|---|---|---|
| 5,712,553 A * | 1/1998 | Hallberg | 307/75 |
| 5,920,129 A | 7/1999 | Smith | |
| 6,100,665 A * | 8/2000 | Alderman | 320/127 |
| 6,166,531 A | 12/2000 | Hogan et al. | |
| 6,181,029 B1 | 1/2001 | Berglund et al. | |
| 6,430,692 B1 * | 8/2002 | Kimble et al. | 713/300 |
| 6,940,187 B2 | 9/2005 | Escobar et al. | |
| 7,301,248 B2 * | 11/2007 | Tsai et al. | 307/66 |
| 2003/0227785 A1 | 12/2003 | Johnson, Jr. | |
| 2007/0210652 A1 | 9/2007 | Tracy et al. | |

* cited by examiner

*Primary Examiner*—Albert W Paladini
*Assistant Examiner*—Daniel Cavallari
(74) *Attorney, Agent, or Firm*—Griffiths & Seaton PLLC

(57) ABSTRACT

A direct current (DC) uninterruptible power supply (UPS) having auto-ranging battery backup voltage capability is provided. At least one input is configured. A rectifier is connected to the at least one input. A common node is connected to the rectifier. At least one output is connected to the common node. A battery backup circuit is connected to the common node. The battery backup circuit includes first and second strings of batteries, a switch connected between a positive terminal of the first string of batteries and a negative terminal of the second string of batteries, and a plurality of steering diodes connected to the first and second strings of batteries and the switch to maintain current flow in a first direction. The switch is operable to place the first and second strings of batteries in series when closed, and operable to place the first and second strings of batteries in parallel when open.

25 Claims, 3 Drawing Sheets

US 7,763,993 B2

DC UPS WITH AUTO-RANGING BACKUP VOLTAGE CAPABILITY

CROSS-REFERENCE TO RELATED APPLICATIONS

This application is related to U.S. Non-Provisional application Ser. Nos. 12/174,381, 12/174,388, and 12/174,425 filed concurrently herewith and incorporated herein by reference.

BACKGROUND OF THE INVENTION

1. Field of the Invention

The present invention relates in general to power supplies for electronic devices, and more particularly, but not exclusively, to a direct current (DC) uninterruptible power supply (UPS) for use in computing environments having an auto-ranging backup voltage capability.

2. Description of the Related Art

An uninterruptible power supply (UPS), also known as an uninterruptible power source, uninterruptible power system, continuous power supply (CPS), or a battery backup is a device which maintains a continuous supply of electrical power to connected equipment by supplying power from a separate source when utility power is not available. A UPS differs from an auxiliary power supply or standby generator, which generally does not provide instant protection from a momentary power interruption.

While not limited to safeguarding any particular type of equipment, a UPS is typically used to protect computers, telecommunications equipment, or other electrical equipment where an unexpected power disruption could cause injuries, business disruption, or data loss. UPS units range in size from units that will back up a single computer to units that will power entire data centers or buildings.

The single phase AC electrical power available in computer or information technology (IT) centers is often classified as either low voltage or high voltage. The low voltage range is traditionally 90 to 132VAC. The high voltage range is traditionally 180 to 264VAC.

SUMMARY OF THE INVENTION

Conventional UPS devices are configured to operate in one of the two voltage ranges (high or low voltage). As a result, two separate UPS configurations are generally required in implementations using both voltage ranges. Use of two UPS configurations adds to overall cost and system complexity.

In light of the foregoing, a need exists for a single UPS configuration having an auto-ranging capability to accommodate either low or high voltage ranges. Accordingly, in one embodiment, by way of example only, a direct current (DC) uninterruptible power supply (UPS) having an auto-ranging backup voltage capability is provided. The DC UPS includes at least one input. At least one rectifier is connected to the at least one input. A common node is connected to the at least one rectifier. At least one DC output is connected to the common node. The at least one DC output is adapted for connection to at least one electrical load. An auto-ranging battery backup circuit is connected to the common node. The auto-ranging battery backup circuit includes negative and positive terminals. First and second diodes are connected to the negative terminal. A first string of batteries is connected to the first diode. A second string of batteries is connected to the second diode. A switch is connected between the first string of batteries and the second string of batteries. A third diode is connected between the first string of batteries and the positive terminal. A fourth diode is connected between the second string of batteries and the positive terminal. The switch places the first and second strings of batteries in parallel when opened, and places the first and second strings of batteries in series when closed.

In an additional embodiment, again by way of example only, a method for configuring a direct current (DC) uninterruptible power supply (UPS) to have an auto-ranging backup voltage capability is provided. At least one input is configured. At least one rectifier is connected to the at least one input. A common node is connected to the at least one rectifier. At least one DC output is connected to the common node, the at least one DC output adapted for connection to at least one electrical load. An auto-ranging battery backup circuit is connected to the common node. Connecting the auto-ranging battery backup circuit includes configuring negative and positive terminals, connecting first and second diodes to the negative terminal, connecting a first string of batteries to the first diode, connecting a second string of batteries to the second diode, connecting a switch between the first string of batteries and the second string of batteries, connecting a third diode between the first string of batteries and the positive terminal, and connecting a fourth diode between the second string of batteries and the positive terminal. The switch places the first and second strings of batteries in parallel when opened, and places the first and second strings of batteries in series when closed.

In an additional embodiment, again by way of example only, a direct current (DC) uninterruptible power supply (UPS) having auto-ranging battery backup voltage capability is provided. At least one input is configured. A rectifier is connected to the at least one input. A common node is connected to the rectifier. At least one output is connected to the common node. A battery backup circuit is connected to the common node. The battery backup circuit includes first and second strings of batteries, a switch connected between a positive terminal of the first string of batteries and a negative terminal of the second string of batteries, and a plurality of steering diodes connected to the first and second strings of batteries and the switch to maintain current flow in a first direction. The switch is operable to place the first and second strings of batteries in series when closed, and operable to place the first and second strings of batteries in parallel when open.

In still another embodiment, again by way of example only, a method of manufacturing a direct current (DC) uninterruptible power supply (UPS) having auto-ranging battery backup voltage capability is provided. At least one input is provided. A rectifier connected to the at least one input is provided. A common node connected to the rectifier is provided. At least one output connected to the common node is provided. A battery backup circuit connected to the common node is provided. First and second strings of batteries are provided. A switch connected between a positive terminal of the first string of batteries and a negative terminal of the second string of batteries is provided. The switch is operable to place the first and second strings of batteries in series when closed, and operable to place the first and second strings of batteries in parallel when open. A plurality of steering diodes connected to the first and second strings of batteries and the switch are provided to maintain current flow in a first direction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for efficiently and inexpensively providing auto-ranging backup voltage capability for UPS devices. These embodiments eliminate the need for separate UPS devices configured for low and high voltages. Further, the embodiments reduce hardware requirements or implement less complex hardware than other known solutions.

Figure 1:
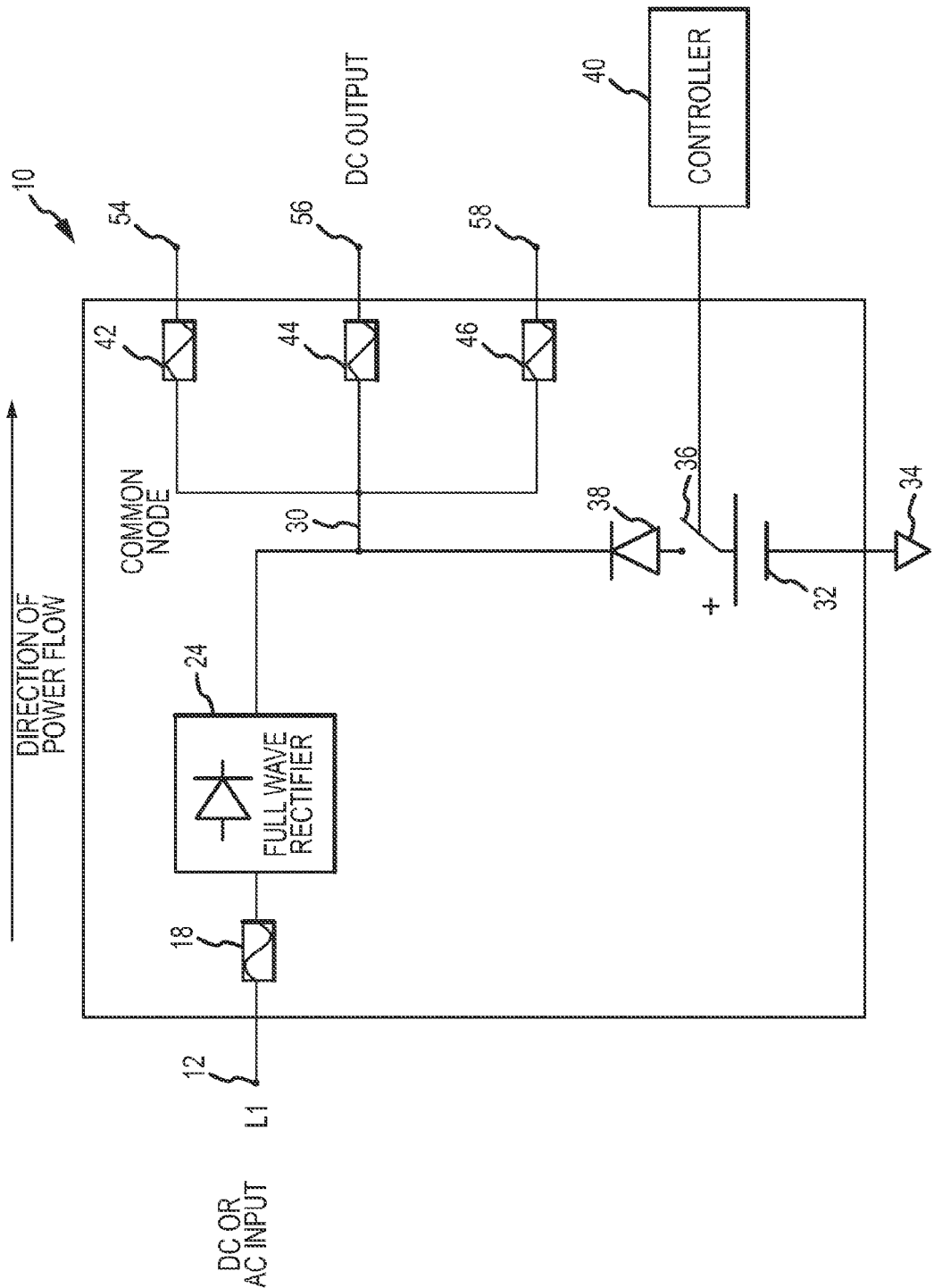
FIG. 1 is a schematic diagram of an exemplary direct current uninterruptible power supply (DC UPS)

Turning to FIG. 1, an exemplary DC UPS 10 is illustrated in which aspects of the present invention may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

DC UPS 10 includes at least one input 12. The input 12 may accept DC or rectified AC power. The input 12 is connected to circuit protection device 18. Circuit protection device 18 may, as one skilled in the art will anticipate, vary for a particular implementation. For example, circuit protection device 18 may include fuses, fuse elements, fusible links, circuit breakers, and the like as the skilled artisan will expect.

Circuit protection device 18 is connected to a rectifier. In the depicted embodiment, full wave rectifier 24 is shown connected to circuit protection device 18. The full wave rectifier 24 is connected to a common node 30. In other embodiments, however, the rectifier 24 may be a half wave rectifier 24.

A battery 32 supplies backup current in the event of a power disruption. Battery 32 is connected between ground 34 and a disconnect switch 36. Disconnect switch 38 is in turn connected to a blocking diode 38. Disconnect switch 38 may be actuated by a controller 40. For example, disconnect switch 38 may be a relay or a similar device. Controller 40 may provide a control signal to the disconnect switch 38 upon a detection of a power disruption from one or more of the inputs 12. As one skilled in the art will expect, disconnect switch 38 may include transistor devices, such as metal oxide semiconductor field effect transistors (MOSFETs).

Circuit protection device 42 is shown connected to the common node 30, and corresponds to one of three DC outputs 54, 56 and 58. DC outputs 54, 56, and 58 are adapted for connection to at least one electrical load. The connected load(s) are shared between the outputs 54, 56, and 58. Circuit protection devices 42, 44, and 46 may again include fuse and circuit breaker devices as previously described to isolate load faults.

DC UPS 10 rectifies input current through input 12. In cases of more than one input 12, each having an input current, the outputs of each of the rectified currents are combined at common node 30.

Figure 2:
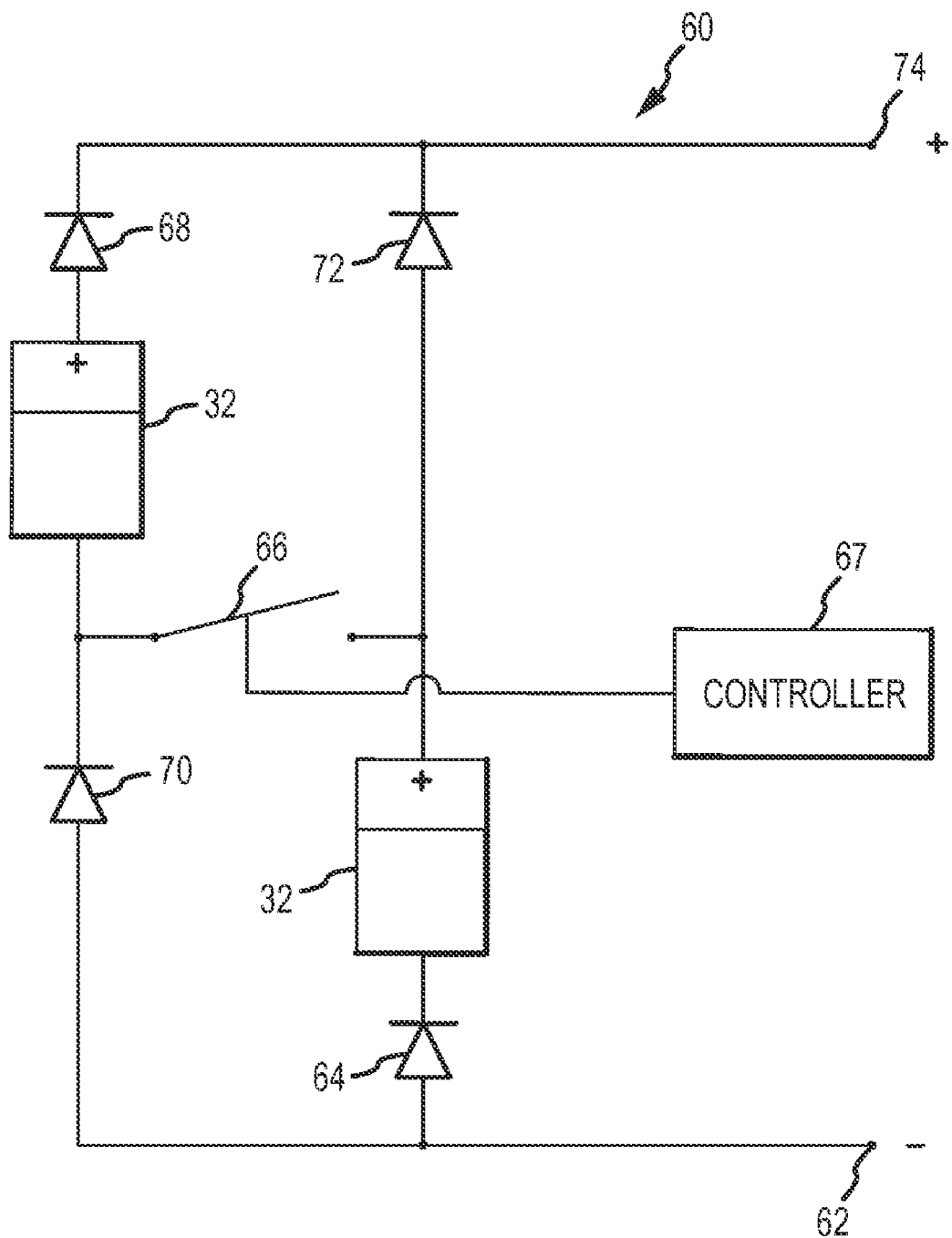
FIG. 2 is schematic diagram of an exemplary battery backup circuit for use in conjunction with the exemplary DC UPS shown in FIG. 1.

To implement DC UPS 10 in an embodiment that provides auto-ranging backup voltage capability, a battery backup circuit may be substituted for the battery 32 as shown in FIG. 1. Turning to FIG. 2, such an exemplary battery backup circuit 60 is depicted. Battery backup circuit 60 includes strings of batteries 32 that are either placed in parallel or in series with each other by a switch 66. Since voltages add in series, the depicted configuration provides a higher backup voltage when switch 66 is closed.

A negative terminal 62 may be connected to ground 34 (FIG. 1). Diodes 64 and 70 are connected in parallel with the negative terminal 62. Diode 64 acts to balance diode drops between the battery strings 32. A first string of batteries 32 is connected to diode 64. A switch 66 connected between the positive terminal of the first string of batteries 32 and the negative terminal of an additional (second) string of batteries 32. Steering diode 68 is connected to the positive terminal of the second string of batteries 32, while steering diode 72 is connected to the switch 66. Switch 66 is shown connected to a controller 67. Finally, steering diodes 68 and 72 are connected to positive terminal 74. Positive terminal 74 may be connected to switch 36 (again, FIG. 1).

As the skilled artisan will appreciate, any number of batteries may be used in strings 32 to provide certain voltages for a particular implementation. In general, however, each string 32 is made up of the same number and type of cells. In addition, an additional string of batteries, along with an additional switch 66, depending on position, reconfigures the DC UPS 10 (FIG. 1) from the low to high-voltage range. The switch 66 may be implemented with a power transistor device, such as a bipolar junction transistor (BJT), metal oxide semiconductor field effect transistor (MOSFET) (such as an N-channel MOSFET), an insulated gate bipolar transistor (IGBT), a relay device, or similar.

Again, to describe an exemplary operation of circuit 60, when switch 66 is in an open position or state, the two battery strings 32 are placed in parallel and the output voltage of the circuit 60 (measured at terminal 74) is in the low range. When the switch is in the closed position or state, the two batter strings 32 are placed in series with each other. Consequently, the output voltage of the circuit 60 is in the high range. To complete an exemplary DC UPS system, the battery charger, control electronics and fans would need to operate across the full low and high voltage ranges. Such a configuration may be easily implemented.

Figure 3:
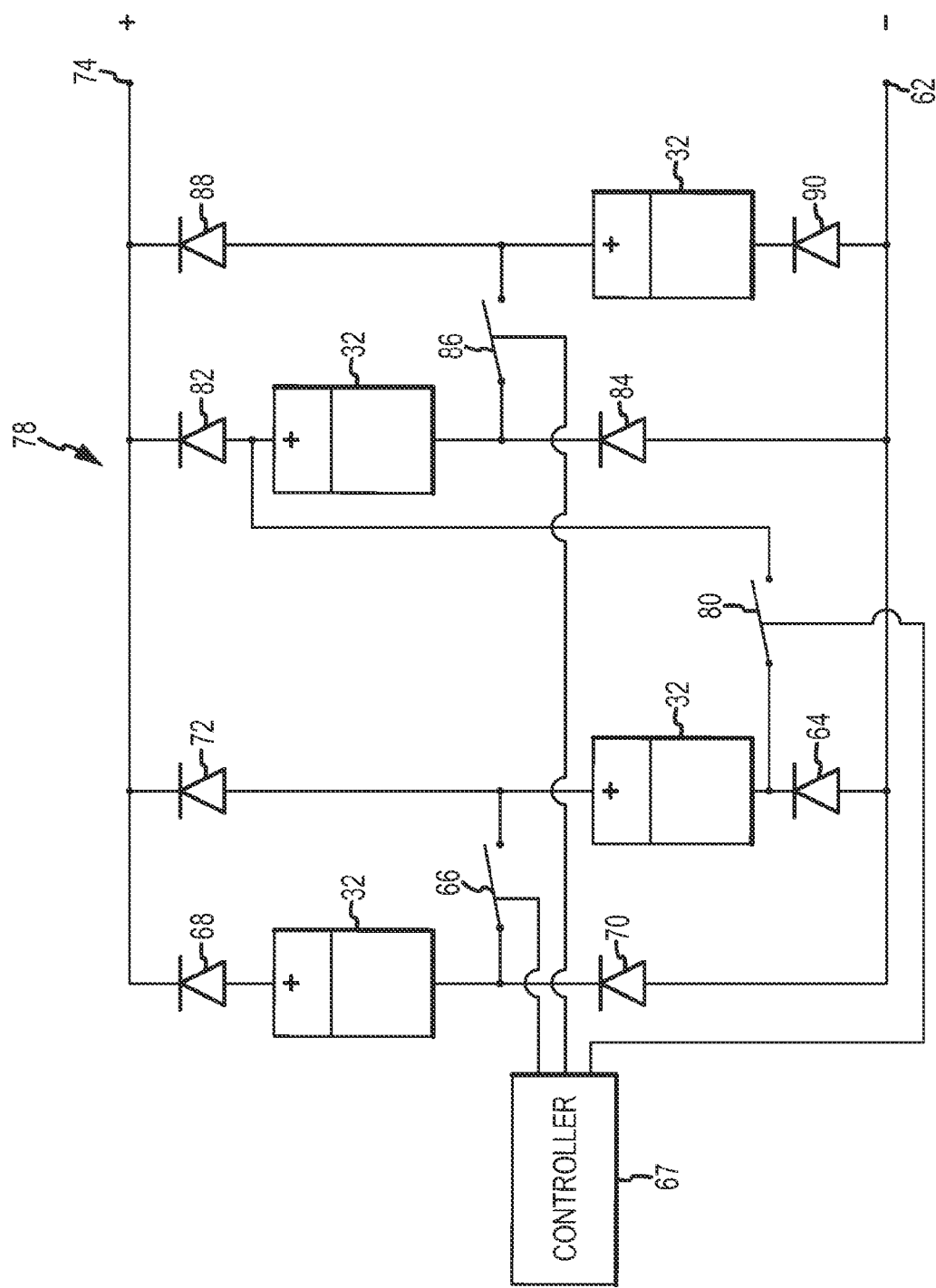
FIG. 3 is a schematic diagram of an additional exemplary battery backup circuit for use in conjunction with the exemplary DC UPS shown in FIG. 1.

Turning to FIG. 3, an additional exemplary schematic diagram of a battery backup circuit 78 is depicted with a three switch/four string configuration. Battery backup circuit 78 includes four strings of batteries 32 and three controllable switches 66, 80, and 86. Switches 66, 80, and 86 may be operated in a manner similar to that described previously by controller 67.

Here, as in FIG. 2, previously, a negative terminal 62 may be connected to ground 34 (FIG. 1). Diodes 64 and 70 are connected in parallel with the negative terminal 62. Diode 64 acts to balance diode drops between the battery strings 32. A first string of batteries 32 is connected to diode 64. A switch 66 connected between the positive terminal of the first string of batteries 32 and the negative terminal of an additional (second) string of batteries 32. Steering diode 68 is connected to the positive terminal of the second string of batteries 32, while steering diode 72 is connected to the switch 66. Switch 66 is shown connected to a controller 67. Finally, steering diodes 68 and 72 are connected to positive terminal 74. Positive terminal 74 may be connected to switch 36 (again, FIG. 1).

A second switch 80 is connected between diode 64 and the second string of batteries 32. Switch 80 is connected to controller 67. Diodes 84 and 90 are connected in parallel with the negative terminal 62. A third string of batteries 32 is connected to diode 90. A switch 86 is connected between the positive terminal of the third string of batteries 32 and the negative terminal of an additional (fourth) string of batteries 32. Steering diode 82 is connected to the positive terminal of the fourth string of batteries 32, while steering diode 88 is connected to the switch 86. Switch 86 is shown connected to a controller 67. Finally, steering diodes 82 and 88 are connected to positive terminal 74.

Diode 90 operates to balance diode drops between battery strings 32. Diode 72 is reversed biased off when switch 66 is closed. Diode 82 is reverse biased off when switches 66 and 80 are closed, or switch 80 is closed. Diode 88 is reverse biased off when switches 66, 80, and 86 are closed, or switches 80 and 86 are closed, or switch 86 is closed. Diode 70 is reverse biased off when switch 66 is closed. Diode 64 is reverse biased off when switch 80 is closed. Finally, diode 84 is reverse biased off when switch 86 is closed.

Several modes of operation are possible using the illustrated embodiment shown in FIG. 3. In a first mode, switches 66, 80, and 86 are all open. As a result, all battery strings 32 are configured in parallel, and Vout=Vbat (output voltage is equal to the voltage of each string of batteries).

In a second mode of operation, switches 66 and 86 are closed, while switch 80 is open. In this case, the first and second battery strings are in series, and the third and fourth battery strings are in series. However, the two series strings are paralleled. As a result, Vout=2×Vbat (output voltage is equal to twice the battery voltage).

In a third mode of operation, switches 66, 80, and 86 are each closed. In this case, all battery strings are in series. As a result, Vout=4×Vbat (output voltage is equal to four times the battery voltage).

In a fourth mode of operation, switch 66 is closed, while the remaining switches 80 and 86 are open. Such a configuration may be useful as a power reserve configuration for electronic equipment. In this case, the first and second strings of batteries are in series. The third and fourth strings of batteries are biased out of the circuit. As a result, Vout=2×Vbat (output voltage is equal to twice the battery voltage). In addition, if switch 80 is closed, then the second and third battery strings are biased out of the circuit. If switch 86 is closed, then the first and second battery strings are biased out of the circuit. Again, any number of strings of batteries may be implemented in similar fashion for a particular situation as the skilled artisan will appreciate.

While one or more embodiments of the present invention have been illustrated in detail, the skilled artisan will appreciate that modifications and adaptations to those embodiments may be made without departing from the scope of the present invention as set forth in the following claims.

What is claimed is:

1. A direct current (DC) uninterruptible power supply (UPS) having an auto-ranging backup voltage capability, comprising:
    at least one input;
    at least one rectifier connected to the at least one input;
    a common node connected to the at least one rectifier;
    at least one DC output connected to the common node, the at least one DC output adapted for connection to at least one electrical load; and
    an auto-ranging battery backup circuit connected to the common node, comprising:
        negative and positive terminals,
        first and second diodes connected to the negative terminal,
        a first string of batteries connected to the first diode,
        a second string of batteries connected to the second diode,
        a switch connected between the first string of batteries and the second string of batteries,
        a third diode connected between the first string of batteries and the positive terminal, and
        a fourth diode connected between the second string of batteries and the positive terminal, wherein the switch places the first and second strings of batteries in parallel when opened, and places the first and second strings of batteries in series when closed.

2. The DC UPS of claim 1, wherein the at least one rectifier is a full wave rectifier.

3. The UPS of claim 1, wherein the at least one rectifier is a half wave rectifier.

4. The UPS of claim 1, further including at least one of a disconnect switch connected between the battery backup circuit and the common node.

5. The UPS of claim 4, wherein the disconnect switch connected between the battery backup circuit and the common node is adapted for connection to a controller for actuating the switch upon a power loss.

6. The UPS of claim 1, wherein the switch of the battery backup circuit is adapted for connection to a controller to adjust the battery backup voltage to one of either a lower or a higher voltage depending upon a state of the switch.

7. The UPS of claim 6, wherein the switch is an N-channel metal oxide semiconductor field effect transistor (MOSFET).

8. The UPS of claim 1, wherein the at least one input is a direct current (DC), alternating current (AC), or rectified alternating current (AC) input.

9. A method for configuring a direct current (DC) uninterruptible power supply (UPS) to have an auto-ranging backup voltage capability, comprising:
    configuring at least one input;
    connecting at least one rectifier to the at least one input;
    connecting a common node to the at least one rectifier;
    connecting at least one DC output to the common node, the at least one DC output adapted for connection to at least one electrical load; and
    connecting an auto-ranging battery backup circuit to the common node, comprising:
        configuring negative and positive terminals,
        connecting first and second diodes to the negative terminal,
        connecting a first string of batteries to the first diode,
        connecting a second string of batteries to the second diode,
        connecting a switch between the first string of batteries and the second string of batteries,
        connecting a third diode between the first string of batteries and the positive terminal, and
        connecting a fourth diode between the second string of batteries and the positive terminal, wherein the switch places the first and second strings of batteries in parallel when opened, and places the first and second strings of batteries in series when closed.

10. The method of claim 9, wherein connecting a common node to the rectifier includes connecting a common node to one of a full wave rectifier and a half wave rectifier.

11. The method of claim 9, further including connecting a disconnect switch between the battery backup circuit and the common node.

12. A direct current (DC) uninterruptible power supply (UPS) having auto-ranging battery backup voltage capability, comprising:
   at least one input;
   a rectifier connected to the at least one input;
   a common node connected to the rectifier;
   at least one output connected to the common node; and
   a battery backup circuit connected to the common node, comprising:
      first and second strings of batteries,
      a switch connected between a positive terminal of the first string of batteries and a negative terminal of the second string of batteries, wherein the switch is operable to place the first and second strings of batteries in series when closed, and operable to place the first and second strings of batteries in parallel when open, and
      a plurality of steering diodes connected to the first and second strings of batteries and the switch to maintain current flow in a first direction.

13. The DC UPS of claim 12, wherein the switch is a power transistor or a relay device.

14. The DC UPS of claim 12, wherein the switch is connected to a controller, the controller selectively operating the switch to provide a lower or higher backup voltage depending on a position of the switch.

15. The DC UPS of claim 12, further including a disconnect switch between the battery backup circuit and the common node.

16. The DC UPS of claim 12, wherein the rectifier is one of a full wave rectifier or a half wave rectifier.

17. The DC UPS of claim 12, further including a circuit protection device connected between the battery backup circuit and the common node.

18. The DC UPS of claim 12, wherein the at least one input is a direct current (DC), alternating current (AC), or rectified alternating current (AC) input.

19. A method of manufacturing a direct current (DC) uninterruptible power supply (UPS) having auto-ranging battery backup voltage capability, comprising:
   providing at least one input;
   providing a rectifier connected to the at least one input;
   providing a common node connected to the rectifier;
   providing at least one output connected to the common node; and
   providing a battery backup circuit connected to the common node, comprising:
      providing first and second strings of batteries,
      providing a switch connected between a positive terminal of the first string of batteries and a negative terminal of the second string of batteries, wherein the switch is operable to place the first and second strings of batteries in series when closed, and operable to place the first and second strings of batteries in parallel when open, and
      providing a plurality of steering diodes connected to the first and second strings of batteries and the switch to maintain current flow in a first direction.

20. The method of manufacture of claim 19, wherein providing a switch connected between a positive terminal of the first string of batteries and a negative terminal of the second string of batteries includes providing a power transistor or a relay device connected between the positive terminal of the first string of batteries and the negative terminal of the second string of batteries.

21. The method of manufacture of claim 19, further including providing a controller connected to the switch, the controller selectively operating the switch to provide a lower or higher backup voltage depending on a position of the switch.

22. The method of manufacture of claim 19, further including providing a disconnect switch between the battery backup circuit and the common node.

23. The method of manufacture of claim 19, wherein providing a rectifier includes providing at least one of a full wave rectifier or a half wave rectifier.

24. The method of manufacture of claim 19, further including providing a circuit protection device connected between the battery backup circuit and the common node.

25. The method of manufacture of claim 19, wherein providing at least one input includes providing a direct current (DC), alternating current (AC), or partially rectified alternating current (AC) input.

* * * * *